Patented Aug. 14, 1945

2,382,189

UNITED STATES PATENT OFFICE 2,382,189

PREPARATION OF NITRIC OXIDE

Milton H. Wahl, Woodbury, N. J., assignor to E. I. du Pont de Nemours & Company, Wilmington, Del., a corporation of Delaware No Drawing. Application July 20, 1940, Serial No. 346,549

2 Claims. (Cl. 23—157)

This invention pertains to a novel method for producing substantially pure nitric oxide.

Substantially pure nitric oxide finds varied application in the fileds of chemistry, biochemistry, and medicine. Heretofore, this material could be produced only by batch processes; consequently a continuous supply of appreciable quantities of this material was not available. Among the methods of the prior art for the production of nitric oxide are those involving the reactions of nitric acid with copper or arsenic trioxide and those involving the reaction between sulfuric acid and sodium nitrite. These permitted the infrequent preparation of small amounts of nitric oxide, but, where a controlled flow is desired, such procedures are inadequate because the regulation thereof is unduly difficult.

An object of the present invention is a process adapted to the continuous production of pure nitric oxide. Another object is a continuous method for producing pure nitric oxide which is characterized by the burning of combustible gases and nitrogen dioxide gas or vaporous nitric acid. A further object is such a method which permits the facile control of the amount of nitric oxide produced, while measuring a substantially constant supply thereof. Other objects will become apparent, as the invention is described more in detail hereinafter.

I have found that the foregoing objects are accomplished by burning a combustible gas in an oxygen-containing gas selected from the group consisting of nitrogen dioxide and vaporous nitric acid, the proportions of the gas mixture being regulated so that there is sufficient oxygen present in said oxygen-containing gas above the NO requirement to oxidize completely the carbon and hydrogen present. When a mixture of this type which possesses thorough intermingling of the combustible gas with the oxygen-containing gas, is ignited, the production of a gas very high in nitric oxide content is effected.

Among the combustible gases which are suitable may be mentioned hydrogen, methane, natural gas, water gas, and petroleum gas distillates. As stated in the foregoing, the combustible gas-nitrogen dioxide or vaporous nitric acid mixture is regulated so that there is sufficient oxygen present to cause oxidation of the carbon and hydrogen to $CO_2$ and $H_2O$. Thus, if a mixture of nitrogen dioxide and methane is employed, the reaction may be indicated by the following equation:

$$4NO_2 + CH_4 \rightarrow CO_2 + 2H_2O + 4NO$$

In such case, it may be seen that 4 volumes of $NO_2$ are required for each volume of $CH_4$ in order that a mixture of the desired composition shall result. The undesired products, i. e., $CO_2$ and $H_2O$ are eliminated simply, the water being separated by condensation and the carbon dioxide being removed by scrubbing with a caustic solution such as sodium hydroxide.

Actually, I prefer to operate with a mixture wherein the nitrogen dioxide or vaporous nitric acid is present in quantity slightly in excess of that required to yield complete oxidation of the carbon and hydrogen present, because I have found that slight excesses of these materials tend to increase the purity of nitric oxide in the effluent gases. The process is illustrated by the following examples:

Example 1

Sources of hydrogen and nitrogen dioxide were introduced by means of separate paths into a small mixing chamber and the resultant mixture passed through an orifice $\frac{3}{32}$ inch in diameter. Said orifice was situated in a burning zone designed to exclude air once it had been eliminated. Previous to establishing the desired rates of flow of the gases, the line and mixing chamber were purged of air by passing hydrogen therethrough, the hydrogen being ignited immediately upon its exit through the orifice. Nitrogen dioxide was then slowly passed into the mixing chamber and thence, through the orifice, where it was burned with the hydrogen. The products of combustion were vented to the atmosphere until all the air had been eliminated from the burning zone. Once this had been accomplished, the rate of flow of hydrogen was set at 2000 cc. per minute and that of nitrogen dioxide at 2025 cc. per minute. The effluent gases were now passed through a cooling zone, a caustic scrubber, and then through a drying tower. The foregoing rates of flow gave a quantity of nitrogen dioxide slightly exceeding that required to oxidize completely the hydrogen. Analysis of the dry gas showed that it contained 97.3% nitric oxide.

Example 2

The conditions of operation in this case were similar to those outlined in the foregoing example, except that nitric acid vapor was employed in place of nitrogen dioxide. The nitric acid vapor was obtained by heating nitric acid of 98% strength at a controlled temperature, which was designed to yield a steady boiling rate of the material. Once the boiling of the nitric acid appeared constant, the flow of hydrogen was started and the gas ignited. After the system had been purged, the rate of flow of the hydrogen was set at 400 cc. per minute, and, since no flowmeter was available for indicating the flow of nitric acid vapor, regulation of the flow of this material was effected as the result of the appearance of the burner chamber. The flame had a uniform orange-yellow color. After condensation of the water vapor present in the gas mixture and removal of carbon dioxide, the finished gas had a nitric oxide content of 92.7%.

It will be understood that any of the known methods for intermingling gases may be employed in conjunction with this invention, so that it is not essential to cause the gases to flow concentrically in order to effect such a mixture. The exact design of apparatus selected for carrying out the process will depend somewhat at least on the rate at which the nitric oxide gas is desired. In this connection, it should be stated that the rates of flow of the combustible gas and the nitrogen dioxide or nitric acid vapors can be varied over very wide limits. Indeed, no limits on the rate of flow of the gases need be observed so long as a flame can be maintained, provided further that the gases issuing from the jet have a velocity sufficient to prevent the flame from propagating to a position inside the jet.

The adoption of my process permits the continuous production of nitric oxide and therefore makes available a convenient and dependable source of this material, while permitting the amount of the material to be controlled readily to satisfy any particular need.

An additional use of my process involves blending the NO produced with a suitable volume of $NO_2$ to yield a mixture equivalent to $N_2O_3$. Such procedure gives a very concentrated gas, that is to say, one which is very high in oxides of nitrogen content. Such gas is adapted for use in the regeneration or stabilization of a fusible mixture of inorganic salts employed as a heat transfer medium, as described in co-pending application Serial No. 341,864, filed June 22, 1940, because of the fact that the concentrated gas mixture may be applied expeditiously without entailing the use of the large and complicated equipment which would be necessary for handling a large volume of dilute gas.

It will be understood that various changes may be made from the foregoing description without departing from the spirit of the invention. I intend therefore to be limited only in accordance with the following claims.

I claim:

1. A method of preparing substantially pure nitric oxide which comprises heating nitric acid of about 98% strength to form nitric acid vapor, mixing said nitric acid vapor with a combustible gas selected from the group consisting of hydrogen and the hydrocarbons, said nitric acid vapor and said combustible gas being supplied in stoichiometrical proportions, passing said mixed gases through an orifice into a burning chamber, igniting and burning the same therein, condensing the water vapor present in the resulting gas mixture, removing the carbon dioxide therefrom, and collecting the substantially pure nitric oxide formed.

2. A method of preparing substantially pure nitric oxide which comprises mixing nitrogen dioxide with a combustible gas selected from the class consisting of hydrogen and the hydrocarbons, said nitrogen dioxide and said combustible gas being supplied in stoichiometrical proportions, passing said mixed gases through an orifice into a burning chamber, igniting and burning the same therein, condensing the water vapor present in the resulting gas mixture, removing the carbon dioxide therefrom, and collecting the substantially pure nitric oxide formed.

MILTON H. WAHL.